United States Patent
Tam et al.

(10) Patent No.: US 10,826,360 B2
(45) Date of Patent: Nov. 3, 2020

(54) MOTOR, ROTOR AND SHAFT SLEEVE THEREOF

(71) Applicant: Johnson Electric International AG, Murten (CH)

(72) Inventors: Siukin Tam, Hong Kong (CN); Huaping Zeng, Shenzhen (CN); Zhengsheng Chen, Shenzhen (CN)

(73) Assignee: JOHNSON ELECTRIC INTERNATIONAL AG, Murten (CH)

(*) Notice: Subject to any disclaimer, the term of this patent is extended or adjusted under 35 U.S.C. 154(b) by 0 days.

(21) Appl. No.: 16/254,166

(22) Filed: Jan. 22, 2019

(65) Prior Publication Data

US 2019/0229592 A1    Jul. 25, 2019

(30) Foreign Application Priority Data

Jan. 22, 2018  (CN) .......................... 2018 1 0058177

(51) Int. Cl.
| | |
|---|---|
| *H02K 13/00* | (2006.01) |
| *H02K 13/04* | (2006.01) |
| *H02K 7/00* | (2006.01) |
| *H02K 1/26* | (2006.01) |
| *H02K 3/12* | (2006.01) |

(52) U.S. Cl.
CPC .......... *H02K 13/006* (2013.01); *H02K 7/003* (2013.01); *H02K 13/04* (2013.01); *H02K 1/26* (2013.01); *H02K 3/12* (2013.01)

(58) Field of Classification Search
CPC ............ H02K 1/27; H02K 7/116; H02K 3/28
USPC ............... 310/75 R, 233, 231, 232, 249, 251
See application file for complete search history.

(56) References Cited

U.S. PATENT DOCUMENTS 8,794,838 B1 *   8/2014   Rosen .................... F16C 43/02
                                                          384/103

FOREIGN PATENT DOCUMENTS

| CN | 101943219 A | * | 1/2011 | |
| DE | 102015219685 | | 4/2017 | |
| DE | 102015219685 A1 | * | 4/2017 | .......... H02K 13/006 |
| EP | 260570 A1 | | 3/1988 | |
| EP | 650244 A1 | | 4/1995 | |
| EP | 1187300 A1 | | 3/2002 | |
| GB | 1420013 A | * | 1/1976 | ............... H02K 3/38 |

(Continued)

OTHER PUBLICATIONS

Machine Translation JP2003319629 (Year: 2003).*

(Continued)

*Primary Examiner* — Jose A Gonzalez Quinones
(74) *Attorney, Agent, or Firm* — Millman IP Inc.

(57) ABSTRACT

A motor, a rotor and a sleeve are provided. The motor includes a stator and a rotor which includes a shaft, a rotor core, a sleeve, a commutator, and a rotor winding wound on the rotor core. The sleeve is arranged between the rotor core and the commutator. The sleeve includes a first end portion close to the commutator, a second end portion close to the rotor core, and a middle portion therebetween. An outer diameter of the first end portion is smaller than an outer diameter of the middle portion, and the outer diameter of the middle portion is smaller than an outer diameter of the second end portion. An end of the commutator close to the sleeve has a groove, and the first end portion of the sleeve is placed in the groove. The rotor has a good seismic performance.

11 Claims, 6 Drawing Sheets

(56) References Cited

FOREIGN PATENT DOCUMENTS

GB          1420013 A      1/1976
JP        2003319629 A   * 11/2003   ............. H02K 13/04

OTHER PUBLICATIONS

Machine Translation CN01943219 (Year: 2011).*
Machine Translation DE102015219685 (Year: 2017).*
Extended European Search Report dated Jun. 7, 2019 in connection with corresponding European application No. 19151016.3.

* cited by examiner

MOTOR, ROTOR AND SHAFT SLEEVE THEREOF

CROSS REFERENCE TO RELATED APPLICATIONS

This non-provisional patent application claims priority under 35 U.S.C. § 119(a) from Patent Application No. 201810058177.5 filed in The People's Republic of China on Jan. 22, 2018.

FIELD OF THE DISCLOSURE

This present disclosure relates to a motor, a rotor and a shaft sleeve thereof.

BACKGROUND OF THE DISCLOSURE

A rotor of a typical brush motor includes a shaft, a rotor core and a commutator fixed to the shaft, and a rotor winding wound around the rotor core. The rotor winding is hooked to a plurality of segments of the commutator. A cylindrical shaft sleeve is mounted between the rotor core and the commutator. Generally, a connection area of the rotor winding and the segments of the commutator is coated with a protection glue, so that it is covered by the protection glue. However, the protection glue is liable to crack and a portion of the rotor winding close to the connection area is easy to break. Therefore, the seismic performance of the rotor is poor.

SUMMARY

Thus, there is a desire for a brush motor, a rotor and a shaft sleeve thereof with a good seismic performance.

According to one aspect, a motor is provided which includes a stator and a rotor. The rotor includes a shaft, a rotor core, a sleeve, a commutator, and a rotor winding wound on the rotor core. The rotor core, the sleeve and the commutator are fixed to the shaft. The sleeve is arranged between the rotor core and the commutator. The sleeve includes a first end portion close to the commutator, a second end portion close to the rotor core, and a middle portion between the first end portion and the second end portion. An outer diameter of the first end portion is smaller than an outer diameter of the middle portion, and the outer diameter of the middle portion is smaller than an outer diameter of the second end portion. An end of the commutator close to the sleeve has a groove, and the first end portion of the sleeve is placed in the groove.

According to another aspect, a rotor is provided which includes a shaft, a rotor core, a sleeve, a commutator, and a rotor winding wound on the rotor core. The rotor core, the sleeve and the commutator are fixed to the shaft. The sleeve is arranged between the rotor core and the commutator. The sleeve includes a first end portion close to the commutator, a second end portion close to the rotor core, and a middle portion between the first end portion and the second end portion. An outer diameter of the first end portion is smaller than an outer diameter of the middle portion, and the outer diameter of the middle portion is smaller than an outer diameter of the second end portion. An end of the commutator close to the sleeve has a groove, and the first end portion of the sleeve is placed in the groove.

According to still another aspect, a shaft sleeve is provided which includes a first end portion close to the commutator, a second end portion close to the rotor core, and a middle portion between the first end portion and the second end portion. An outer diameter of the first end portion is smaller than an outer diameter of the middle portion, and the outer diameter of the middle portion is smaller than an outer diameter of the second end portion. An end of the commutator close to the sleeve has a groove, and the first end portion of the sleeve is placed in the groove.

In embodiments of the present disclosure, a first end portion of the shaft sleeve is placed into the groove of the commutator, so that the strength of the shaft at a position corresponding to a connection area of the sleeve and the commutator is increased, and thus the deformation of the shaft at this position caused by external vibration is reduced. Therefore, the break of the rotor winding can be avoided. In addition, the outer diameter of the second end portion is set greater than the outer diameter of the first end portion and the middle portion. Therefore, the second end portion can support the rotor winding passing by the second end portion, and thus reducing the displacement of a portion of the rotor winding close to the second end portion. As a result, the brush motor, the rotor and the shaft sleeve thereof have a good seismic performance.

BRIEF DESCRIPTION OF THE DRAWINGS

A preferred embodiment of the disclosure will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
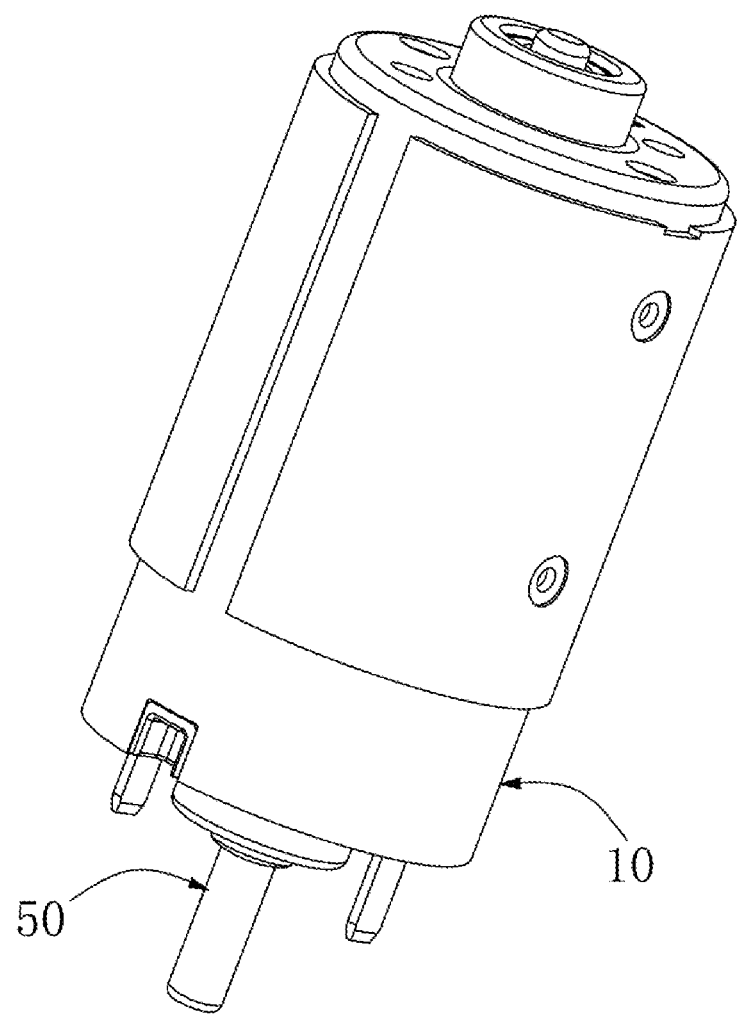
FIG. 1 is a schematic diagram of a motor according to a preferred embodiment of the present disclosure.

The subject matter will be described in conjunction with the accompanying drawings and the preferred embodiments. The described embodiments are only a few and not all of the embodiments of the present disclosure. All other embodiments obtained by those ordinarily skilled in the art based on the embodiments of the present disclosure without any creative efforts fall within the protection scope of the present disclosure. It is to be understood that, the drawings are provided for reference only and are not intended to be limiting of the invention. The dimensions shown in the drawings are only for convenience of illustration and are not intended to be limiting.

It should be noted that when a component is considered to be "connected" to another component, it can be directly connected to another component or may also have a centered component. Unless otherwise defined, all technical and scientific terms used herein have the same meaning as commonly understood by those ordinarily skilled in the art. The terminology used in the specification of the present disclosure is only for the purpose of describing particular embodiments and is not intended to limit the invention.

Figure 2:
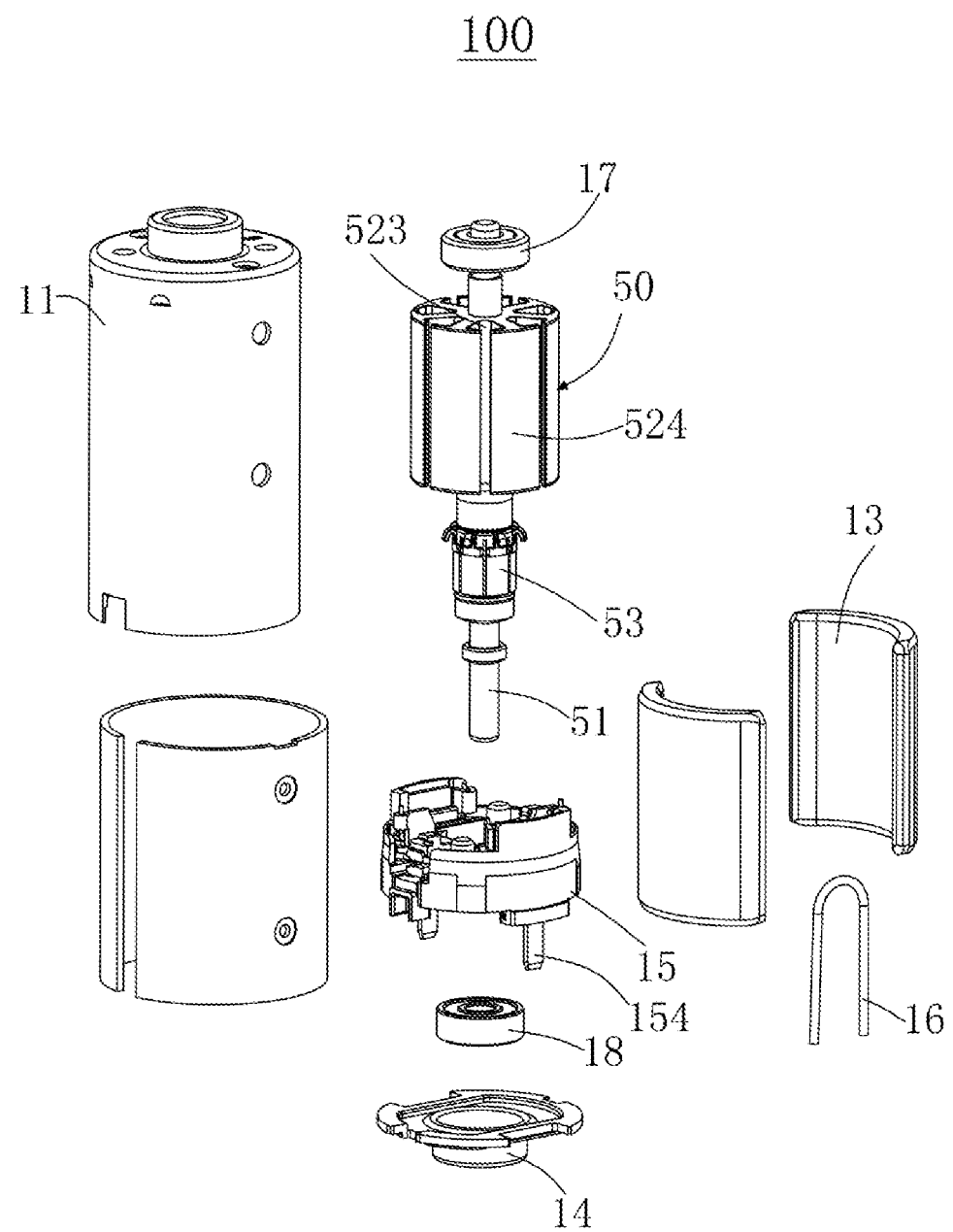
FIG. 2 is an exploded view of the motor of FIG. 1.

Referring to FIGS. 1 and 2, a motor 100 of a preferred embodiment of the present disclosure is a brush direct current motor, which is particularly suitable for being applied to engine air management (EAM) systems of motor vehicles, such as electronic throttle control valves, exhaust gas recirculation valves, electric waste gate valves, and so on. The motor 100 includes a stator 10, and a rotor 50 mounted into the stator 10 and rotatable with respect to the stator 10.

The stator 10 includes a housing 11, at least one permanent magnet 13 fixed to an inner wall of the housing 11. In the embodiment, the housing 11 has an open end and a closed end. The stator 10 further includes an end cap mounted to the open end of the housing 11 and an end cover 14 mounted to an outer side of the end cap 15. The rotor 50 is mounted into the housing 11.

Figure 5:
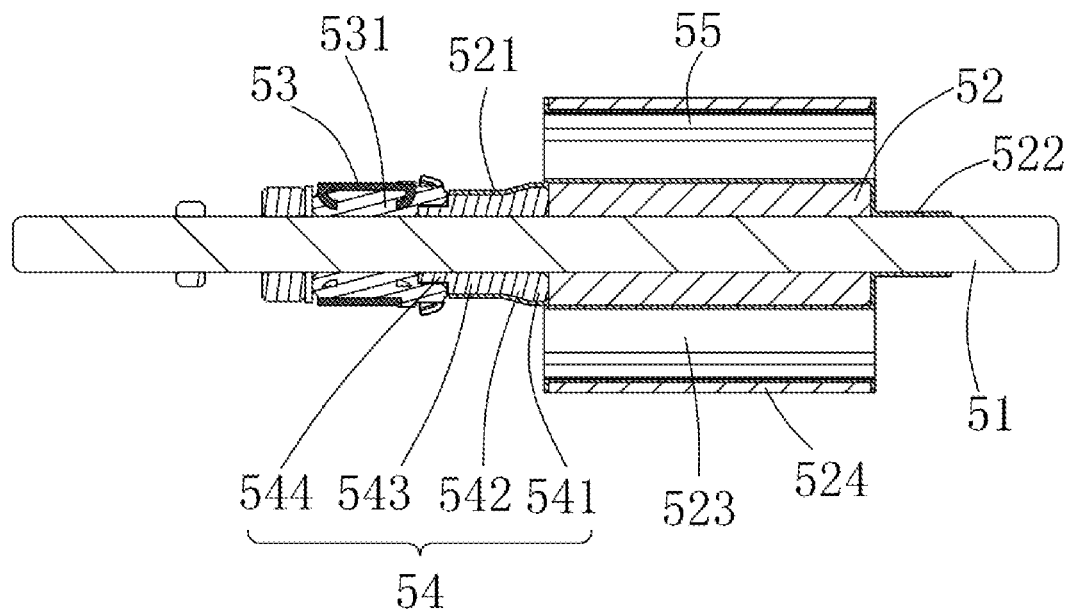
FIG. 5 is a section view of a rotor of the motor of FIG. 2.

Further referring to FIG. 5, the rotor 50 includes a shaft 51, a rotor core 52 fixed to the shaft 51, a commutator 53, and a rotor winding 56 wound around the rotor core 52. A sleeve 54 is fixed to the shaft 51, and arranged between the rotor core 52 and the commutator 53. The shaft 51 is supported by a bearing 17 mounted to the closed end of the housing 11 and a bearing 18 mounted to the end cover 14, so that the rotor 50 is rotatable with respect to the stator 10. An end of the shaft 51 passes through the end cap 15 and end cover 14 for driving an external element.

In the embodiment, two axial ends of the sleeve 54 directly contact the commutator 53 and the rotor core 52, respectively. In an alternative embodiment, the axial end of the sleeve 54 also can indirectly contact the rotor core 52 via some elements, such as one or more washers.

The rotor core 52 has a plurality of winding slots 523 extending along an axial direction of the motor 100. There are a plurality of teeth portions 524, each of which is formed between two adjacent winding slots 253. An insulating layer 55 is formed on an inner surface of each winding slot 523 and two end surfaces of the rotor core 52.

Preferably, the material of the insulating layer 55 may be epoxy resin. The insulating layer 55 may be formed by spraying after the rotor core 52 and the sleeve 54 are assembled. The insulating layer 55 further includes a first portion 521 surrounding the sleeve 54 arranged at one end of the rotor core 52 and a second portion 522 surrounding a part of the shaft 51 located at the other end of the rotor core 52.

Figure 6:
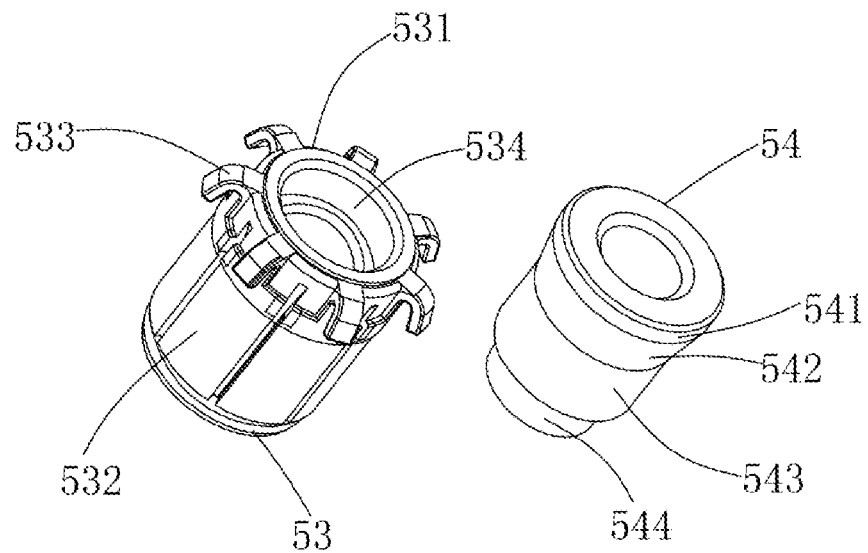
FIG. 6 is a schematic diagram of unassembled commutator and sleeve of a rotor of the motor of FIG. 2.

Further referring to FIG. 6, the commutator 53 may be cylindrical, including an annular insulating base 531 and a plurality of segments 532 respectively arranged at an outer peripheral surface of the insulating base 531 along a circumferential direction of the insulating base 531. The ends of the segments 532 close to the sleeve 54 are formed with a plurality of hooks 533 for hooking the rotor winding 56. The rotor winding 56 crosses the sleeve 54 to hook the hooks 533 to form an electrical connection therebetween. Preferably, connection points (not labeled) of the rotor winding 56 and the hooks 533 and a portion of the rotor winding 56 adjacent to the connection points are covered by an annular protection layer (not shown). The material of the annular protection layer may be glue, such as epoxy resin. An end of the insulating base 531 close to the sleeve 54 is formed with a groove 534.

The sleeve 54 includes a first end portion 544 close to the commutator 53, a second end portion 542 close to the rotor core 52, and a middle portion 543 located therebetween. An outer diameter of the first end portion 544 is smaller than an out diameter of the middle portion 543. The outer diameter of the middle portion 543 is smaller than an outer diameter of the second end portion 542. The three portions 544, 543, 542 have the same inner diameter, so a radial thickness of the second end portion 542 is greater than radial thicknesses of the first end portion 544 and the middle portion 543.

Figure 7:
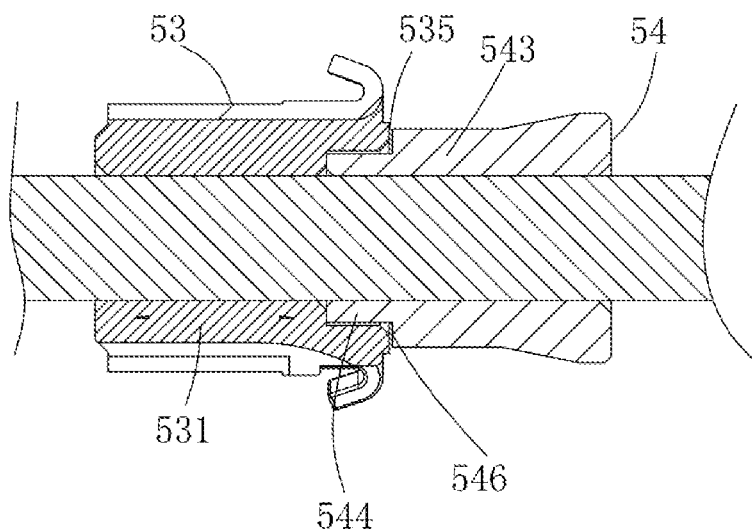
FIG. 7 is a section view of assembled commutator and sleeve of FIG. 6.
Figure 8:
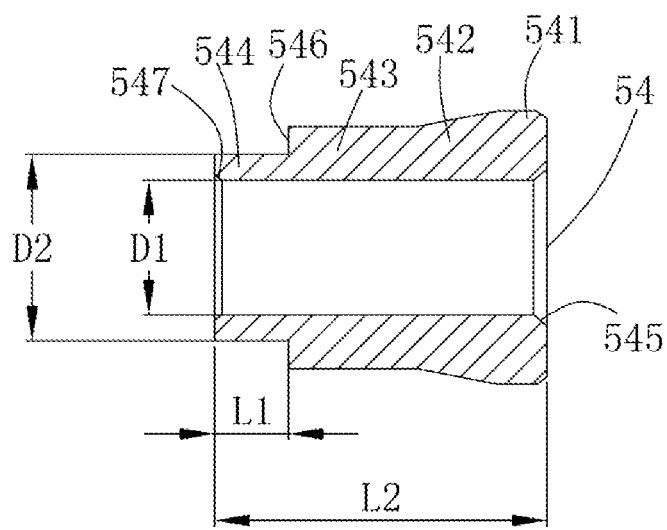
FIG. 8 is a section view of the sleeve of FIG. 6.
Figure 9:
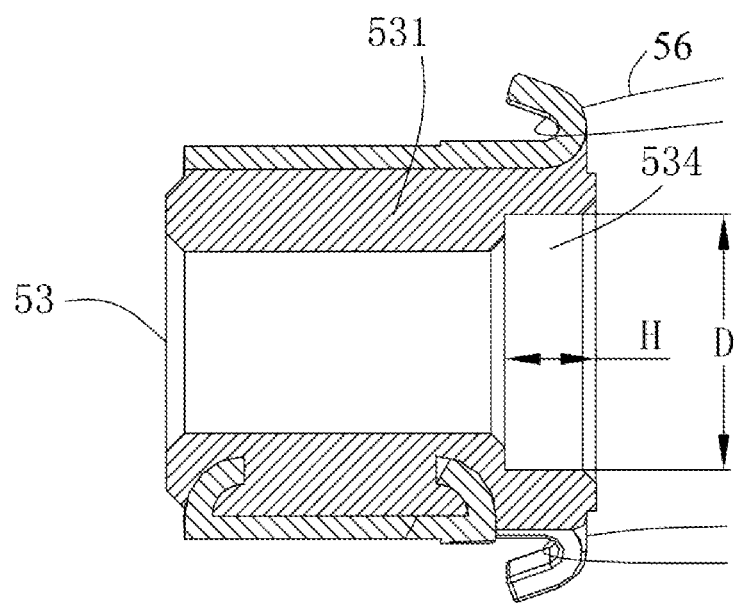
FIG. 9 is a section view of the commutator of FIG. 6.

Referring to FIGS. 7 to 9, the first end portion 544 and the groove 534 of the commutator 53 are preferably cylindrical. The middle portion 543 has an end surface 546 which is connected with the first end portion 544 and perpendicular to an axial direction of the rotor. In the embodiment, the inner diameters of the sleeve 54 and the commutator 53 are slightly smaller than an outer diameter of the shaft 51, so that the sleeve 54 and the commutator 53 are tightly fitted to the shaft 51. Preferably, the inner diameter of the commutator 53 is slightly greater than the inner diameter of the sleeve 54, and there is an adhesive between the commutator 53 and the shaft 51. The sleeve is made of metal, preferably made of stainless steel or copper. A ratio of the outer diameter D2 of the first end portion 544 to the inner diameter D1 thereof ranges from 1.2 to 1.5, preferably from 1.27 to 1.33. A ratio of an axial length L1 of the first end portion 544 to a total axial length L2 of the sleeve 54 ranges from 0.20 to 0.025, preferably from 0.22 to 0.24.

Preferably, the axial length L1 of the first end portion 544 is slightly greater than a depth H of the groove 534 of the insulating base 531, so that a first gap (not labeled) is formed between the axial end surface 535 of the commutator 53 and the axial end surface 546 of the middle portion. The outer diameter D2 is slightly smaller than the inner diameter D of the groove 534, so that a second gap (not labeled) is formed between the outer circumferential surface of the first end portion 544 and the inner circumferential surface of the groove 534. Preferably, the first gap and the second gap are filled with adhesives.

In the embodiment, an overall shape of the middle portion 543 and the second end portion 542 is like a trumpet. Specifically, the middle portion 543 of the sleeve 54 is cylindrical. The second end portion 542 is substantially in a shape of truncated cone. The outer diameter of the second end portion 542 gradually increases from the middle portion 543.

The second end portion 542 may further include a cylindrical extension portion 541 extending axially from the second end portion 542. Preferably, two chamfers 545, 547 are respectively formed at inner circumferences of two axial ends of the sleeve 54, so that the sleeve 54 is easily fitted to the shaft 51. Preferably, inner circumferences of two axial ends of the insulating base 531 of the commutator 53 are also provided with chamfers (not labeled), so that the commutator 53 is easily fitted to the shaft 51 and the sleeve 54.

In an alternative embodiment, the overall shape of the middle portion 543 and the second end portion 542 may be a truncated cone with a gradually increasing outer diameter. In an alternative embodiment, the overall shape the middle portion 543 and the second end portion 542 may be two cylinders having different outer diameters and axially connected together.

In the embodiment, the number of the permanent magnets is two. The two permanent magnets 13 are symmetrically fixed to the inner wall of the housing 11. A U-shaped spring 16 is mounted between the two permanent magnets 13.

Figure 3:
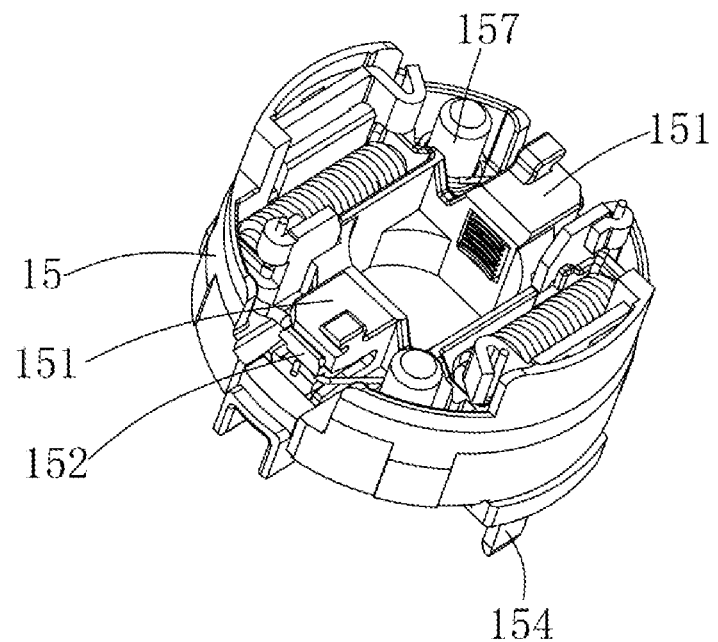
FIG. 3 is a schematic diagram of an end cap of a stator of the motor of FIG. 1.
Figure 4:
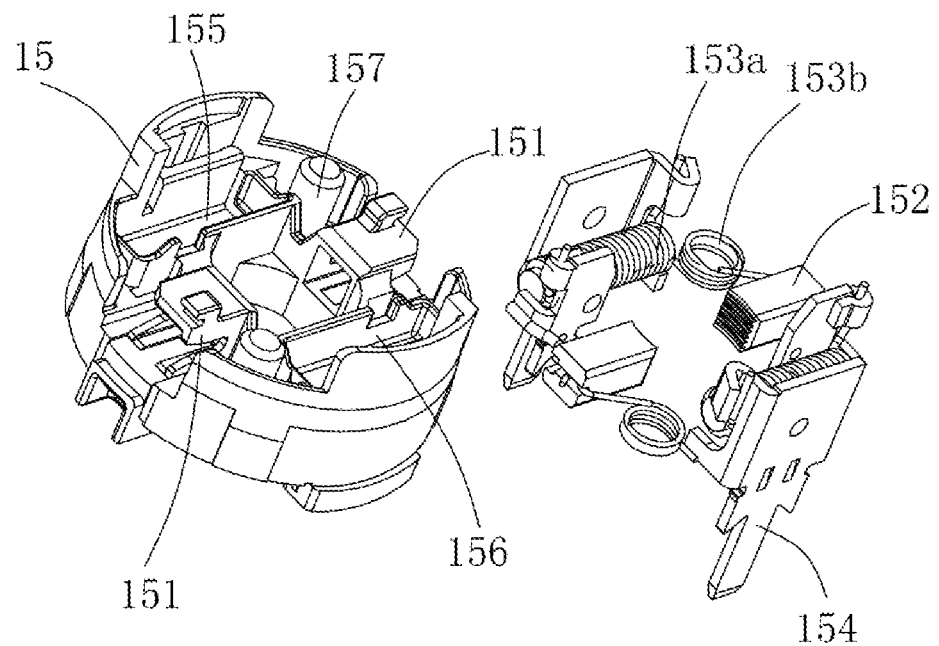
FIG. 4 is an exploded view of the end cap of FIG. 3.

Referring to FIGS. 3 to 4, the end cap 15 is mounted with brushes 152, filter elements, and two power terminals 154. The power terminals 154 provide a power supply for the rotor 50 via the brushes 152. Specifically, one side of the end cap 15 away from the end cover 14 has two brush holders 151. The brushes 152 are mounted to corresponding brush holders 151, slidably contacting the segments 532 of the commutator 53 under radial forces from torsional springs (not labeled). The filter elements includes two inductors 153a respectively mounted to two horizontal mounting grooves 155, 156. Each torsional spring is fixed to an axial positioning post 157 formed on the end cap 15. Preferably, the two power terminals 154 are substantially facing each other along a diameter of the end cap 15, the two brushes are substantially facing each other along a diameter of the end cap 15, and the two inductors 153a are also substantially facing each other along a diameter of the end cap 15.

The rotor core 52, the sleeve 54 and the commutator 53 are housed in the housing 11. A portion of the commutator 53 is arranged into a through hole (not labeled) of the end cap 15, so that the brushes 152 can slidably contact the segments 532 of the commutator 53.

The first end portion 544 is placed into the groove 534 of the commutator 53, so that the strength of the shaft 51 at a position corresponding to a connection area of the sleeve 54 and the commutator 53 is increased, and thus the deformation of the shaft 51 at this position caused by external vibration is reduced. As a result, the displacement of the commutator 53 at a position corresponding to the hooks 533 can be reduced, and the cracking of the protection glue and the break of the rotor winding 56 can be avoided. In addition, the outer diameter of the second end portion 542 is set greater than the outer diameter of the first end portion 544 and the middle portion 543. The second end portion 542 can support the rotor winding 56 passing by the second end portion 542, and thus reducing the displacement of a portion of the rotor winding 56 close to the second end portion 542. Consequently, the rotor 50 has a good seismic performance.

In addition, a test results show that the displacement of the commutator 53 at a position corresponding to the hooks 533 can be reduced by about 18%, so the risk about the cracking of the protection glue and the break of the rotor winding 56 is greatly reduced.

The above descriptions are only preferred embodiments of the present disclosure, and are not to limit the present disclosure. Any changes, equivalents, modifications and the like, which are made within the spirit and principle of the present disclosure, shall fall within the protection scope of the present disclosure.

The invention claimed is:

1. A rotor for a motor, comprising a shaft, a rotor core, a sleeve, a commutator, and a rotor winding wound on the rotor core; the rotor core, the sleeve and the commutator being fixed to the shaft; the sleeve being arranged between the rotor core and the commutator;

wherein, the sleeve comprises a first end portion close to the commutator, a second end portion close to the rotor core, and a middle portion between the first end portion and the second end portion;

an outer diameter of the first end portion is smaller than an outer diameter of the middle portion, and the outer diameter of the middle portion is smaller than an outer diameter of the second end portion;

an end of the commutator close to the sleeve has a groove, and the first end portion of the sleeve is placed in the groove, the first end portion of the sleeve and the groove of the commutator being cylindrical;

the sleeve is made of metal, the middle portion of the sleeve is cylindrical, and the second end portion of the sleeve is in a shape of truncated cone; and the sleeve is surrounded by an insulating layer.

2. The rotor according to claim 1, wherein the sleeve is made of stainless steel or copper.

3. The rotor according to claim 1, wherein a ratio of the outer diameter of the first end portion to an inner diameter of the first end portion ranges from 1.2 to 1.5.

4. The rotor according to claim 1, wherein a ratio of an axial length of the first end portion to a total axial length of the sleeve ranges from 0.20 to 0.025.

5. The rotor according to claim 1, wherein an axial length of the first end portion is greater than a depth of the groove, so that a first gap is formed between an end surface of the commutator and an end surface of the middle portion of the sleeve.

6. The rotor according to claim 5, wherein the first end portion of the sleeve and the groove of the commutator are cylindrical, and the outer diameter of the first end portion is smaller than an inner diameter of the groove, so that a second gap is formed between an outer circumferential surface of the first end portion and an inner circumferential surface of the groove.

7. The rotor according to claim 6, wherein the first gap and the second gap are filled with adhesives.

8. The rotor according to claim 1, wherein the insulating layer further surrounds a part of the shaft located at the other end of the rotor core.

9. A motor, comprising a stator and a rotor, the rotor comprising a shaft, a rotor core, a sleeve, a commutator, and a rotor winding wound on the rotor core; the rotor core, the sleeve and the commutator being fixed to the shaft; the sleeve being arranged between the rotor core and the commutator;

wherein, the sleeve comprises a first end portion close to the commutator, a second end portion close to the rotor core, and a middle portion between the first end portion and the second end portion;

an outer diameter of the first end portion is smaller than an outer diameter of the middle portion, and the outer diameter of the middle portion is smaller than an outer diameter of the second end portion;

an end of the commutator close to the sleeve has a groove, and the first end portion of the sleeve is placed in the groove, the first end portion of the sleeve and the groove of the commutator being cylindrical;

the sleeve is made of metal, the middle portion of the sleeve is substantially cylindrical, and the second end portion of the sleeve is substantially in a shape of truncated cone; and the sleeve is surrounded by an insulating layer.

10. The motor according to claim 9, wherein the sleeve is made of stainless steel or copper.

11. The motor according to claim 9, wherein the insulating layer further surrounds a part of the shaft located at the other end of the rotor core are surrounded by an insulating layer.

* * * * *